Patented Sept. 7, 1954

2,688,618

UNITED STATES PATENT OFFICE 2,688,618

BASIC CAFFEINE DERIVATIVES

Douglas E. Cooper, Syracuse, and Lee C. Cheney, Fayetteville, N. Y., assignors to Bristol Laboratories Inc., Syracuse, N. Y., a corporation of New York No Drawing. Application January 3, 1952,
Serial No. 264,842

8 Claims. (Cl. 260—256)

This invention relates to ethers derived from caffeine, and more particularly to mixed ethers derived from 8-hydroxy-caffeine and beta-aminoalcohols.

A considerable number of caffeine ethers have been prepared and studied, but so far as is known the only one ever to have found a place in practical therapeutics is 8-ethoxycaffeine, which is a stimulant somewhat more active than the parent alkaloid. The perhydrocarbazylethoxy ether (Bockmuhl et al., U. S. 2,003,623, June 4, 1935) has been stated to have therapeutic properties.

We have now found that the free bases, the acid addition salts and the quaternary salts of 8-ethyl ethers of caffeine substituted in the beta position of the ethyl group by lower dialkylamino radicals and by radicals from simple monocyclic bases have valuable therapeutic properties.

We prepare our compounds by reacting 8-chloro- or 8-bromocaffeine with the sodium or other alkali metal derivative of the appropriate beta-substituted ethanol at low to moderate temperatures, usually between 50° and 100° C. In most cases the substantially higher temperatures ranging up to 170° which have been employed in preparing the known caffeine ethers fail to give the products of this invention, but yield other materials, especially one which has been identified as 8-hydroxy-caffeine.

Examples of the alcohols employed in our reaction are beta-dimethyl-aminoethanol, beta-diethylaminoethanol, beta - dipropylaminoethanol, beta-dibutylaminoethanol, beta-N-piperidinoethanol, beta-N-pyrrolidinoethanol, and beta-N-morpholinoethanol. More generally expressed the alcohols employed in this invention are represented by the formula

B—CH2CH2OH wherein B is a basic radical selected from the group consisting of piperidino, pyrrolidino, morpholino, and dialkylamino radicals wherein the alkyl radicals contain 1 to 4 carbon atoms.

We now describe in detail the methods we employ for preparing typical members of our new class of compounds.

*Example 1.—8-beta-dimethylaminoethoxy caffeine.*—A solution of 2.3 grams finely cut sodium in 100 ml. dimethylaminoethanol is prepared by stirring at room temperature. To this is added 100 ml. toluene and 22.9 grams 8-chlorocaffeine, and the solution warmed to 65° for 30 minutes. After the sodium chloride is filtered off, dilution of the filtrate with 200 ml. petroleum ether (B. P. 28–38° C.) and standing produces 16.4 grams of white, crystalline, nearly pure product. When heated it begins to melt at 124° but immediately begins recrystallizing and is solid again at about 150°. The new solid then melts at 249–50° with darkening and evolution of gas. Recrystallization from hot toluene does not change the melting characteristics.

*Example 2.—8-beta-dimethylaminoethoxy caffeine hydrochloride.*—The free base, 15 grams, prepared as in Example 1, is dissolved in 225 ml. 95% ethanol and treated with 16.5 ml. 4.2 normal ethanolic hydrogen chloride. The white crystalline product which soon separates is filtered off, washed with a little ethanol, then ether. Yield: 13 grams. The product does not melt but gradually darkens upon heating, decomposing completely somewhat above 300°.

| Analysis | Found |
|---|---|
| Calculated for $C_{12}H_{20}N_5O_3Cl$: | |
| C, 45.8 | 45.7 |
| H, 6.35 | 6.12 |
| N, 22.1 | 21.6 |

*Example 3.—8-beta-dimethylaminoethoxycaffeine methiodide.*—The free base, 25 grams, prepared as in Example 1, is dissolved in 400 ml. 95% ethanol and mixed with 12.5 ml. methyl iodide. After standing two hours at room temperature the solution is chilled 12 hours in the refrigerator, finally in an ice bath. The white crystals are filtered off, washed with acetone and dried. Yield: 33 grams, M. P. 226° (capillary placed in bath pre-heated to 220°).

| Analysis | Found |
|---|---|
| Calculated for $C_{13}H_{22}N_5O_3I$: | |
| C, 36.9 | 37.2 |
| H, 5.24 | 5.34 |

*Example 4.—8 - beta - diethylaminoethoxycaffeine.*—A solution of sodium derivative in 100 ml. diethylaminoethanol and toluene is prepared and reacted with 8-chlorocaffeine as in Example 1. After removal of sodium chloride the solution is diluted to the point of incipient turbidity with petroleum ether (B. P. 28–38° C.) (about 400 ml.) and slowly cooled to 0° C. The white crystalline precipitate is filtered, washed with petroleum ether and dried in the air. Yield: 17 grams, M. P. 100°.

*Example 5.—8 - beta - diethylaminoethoxycaffeine hydrochloride.*—The free base, 15 grams, prepared as in Example 4, is dissolved in 350 ml.

ether plus 200 ml. acetone, and the stirred solution is treated with 15 ml. 4.2 normal ethanolic hydrogen chloride. After 15 minutes the white slurry is filtered, and the precipitate washed with acetone, then ether. Yield: 16.3 grams. Upon heating, a change characterized by transient melting is observed at 192°, forming another solid which decomposes above 300°. The salt is readily recrystallized from isopropanol, with no effect on the transition point or decomposition behavior.

| Analysis | Found |
|---|---|
| Calculated for $C_{14}H_{24}N_5O_3Cl$: | |
| C, 48.6 | 49.0 |
| H, 7.00 | 7.09 |
| N, 20.3 | 19.7 |

The ultraviolet adsorption of this compound may be measured on a solution of 8.7 milligrams in 1000 ml. water. It shows a single strong maximum within the 250–300 millimicron range at 279 millimicrons; log molecular extinction coefficient: 4.1. This maximum and its intensity check with that of the known 8-methoxy caffeine (Fromherz, Berichte 69B, 2420 (1936), and is further evidence of the correctness of the structure assigned the present series of compounds.

*Example 6.—8 - beta - diethylaminoethoxycaffeine methiodide monohydrate.*—The free base, 25.5 grams, prepared as in Example 4, is dissolved in 570 ml. isopropanol and refluxed gently 1 hour with 12 grams methyl iodide. The solution is gradually cooled to ice temperature, and the white salt filtered off, washed, and dried. Yield: 20.5 grams. M. P. (capillary placed in 160° bath): 187° with gas evolution and discoloration. Recrystallization from 400 ml. 99% isopropanol containing 12 ml. added water gives 16 grams pure salt, melting with gas evolution at 195° in a capillary placed in a 190° pre-heated bath.

| Analysis | Found |
|---|---|
| Calculated for $C_{13}H_{25}N_5O_3I \cdot H_2O$: | |
| C, 38.5 | 38.7 |
| H, 5.95 | 5.63 |
| N, 14.9 | 15.1 |

We claim:

1. Compounds selected from the group consisting of compounds having the general formula

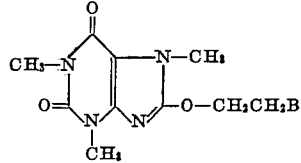

wherein B is a basic radical selected from the group consisting of amino, piperidino, pyrrolidino, morpholino, and dialkylamino radicals wherein the alkyl radicals contain 1 to 4 carbon atoms, and their acid addition salts and quaternary salts.

2. The compound 8-beta-dimethylaminoethoxycaffeine.

3. The acid addition salts of 8-beta-dimethylaminoethoxycaffeine.

4. The quaternary salts of 8-beta-dimethylaminoethoxycaffeine.

5. The compound 8-beta-diethylaminoethoxycaffeine.

6. The acid addition salts of 8-beta-diethylaminoethoxycaffeine.

7. The quaternary salts of 8-beta-diethylaminoethoxycaffeine.

8. The process of reacting an alkali metal derivative of an alcohol substituted in the beta position by a basic radical selected from the group consisting of piperidino, pyrrolidino, morpholino and dialkylamino radicals wherein the alkyl radicals contain 1 to 4 carbon atoms with a member selected from the group consisting of 8-bromocaffeine and 8-chlorocaffeine to form a basic ether of caffeine.

References Cited in the file of this patent

FOREIGN PATENTS

| Number | Country | Date |
|---|---|---|
| 586,802 | Germany | Oct. 6, 1933 |